United States Patent
Ghosh et al.

(10) Patent No.: US 9,258,227 B2
(45) Date of Patent: *Feb. 9, 2016

(54) NEXT HOP CHAINING FOR FORWARDING DATA IN A NETWORK SWITCHING DEVICE

(71) Applicant: JUNIPER NETWORKS, INC., Sunnyvale, CA (US)

(72) Inventors: Kaushik Ghosh, Sunnyvale, CA (US); Kireeti Kompella, Los Altos, CA (US); Siva Gaggara, Sunnyvale, CA (US); Nitin Kumar, Fremont, CA (US); Steven Lin, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/969,902

(22) Filed: Aug. 19, 2013

(65) Prior Publication Data

US 2013/0329603 A1    Dec. 12, 2013

Related U.S. Application Data

(63) Continuation of application No. 13/192,216, filed on Jul. 27, 2011, now Pat. No. 8,514,744, which is a continuation of application No. 12/195,686, filed on Aug. 21, 2008, now Pat. No. 8,014,317.

(51) Int. Cl.
*H04L 12/741* (2013.01)
*H04L 12/46* (2006.01)
*H04L 12/751* (2013.01)
*H04L 12/723* (2013.01)

(52) U.S. Cl.
CPC .......... *H04L 45/745* (2013.01); *H04L 12/4633* (2013.01); *H04L 45/02* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,259,699 B1 | 7/2001 | Opalka et al. | |
| 6,385,199 B2 | 5/2002 | Yoshimura et al. | |
| 6,529,958 B1 * | 3/2003 | Oba et al. | 709/237 |
| 6,687,247 B1 * | 2/2004 | Wilford | H04L 12/5693 370/392 |
| 6,711,152 B1 | 3/2004 | Kalmanek et al. | |
| 6,711,661 B1 * | 3/2004 | Zabarski et al. | 711/202 |
| 6,721,800 B1 | 4/2004 | Basso et al. | |
| 6,798,777 B1 * | 9/2004 | Ferguson et al. | 370/392 |
| 6,963,924 B1 * | 11/2005 | Huang et al. | 709/238 |
| 6,987,735 B2 | 1/2006 | Basso et al. | |
| 6,987,762 B2 * | 1/2006 | Shiota | 370/389 |
| 7,028,101 B2 | 4/2006 | Costa-Requena et al. | |
| 7,079,501 B2 | 7/2006 | Boivie | |
| 7,085,235 B2 * | 8/2006 | Pin et al. | 370/235 |
| 7,099,324 B2 * | 8/2006 | Kametani | 370/392 |

(Continued)

*Primary Examiner* — Gregory Sefcheck
(74) *Attorney, Agent, or Firm* — Harrity & Harrity, LLP

(57) ABSTRACT

A route for a data unit through a network may be defined based on a number of next hops. Exemplary embodiments described herein may implement a router forwarding table as a chained list of references to next hops. In one implementation, a device includes a forwarding table that includes: a first table configured to store, for each of a plurality of routes for data units in a network, a chain of links to next hops for the routes; and a second table configured to store the next hops. The device also includes a forwarding engine configured to assemble the next hops for the data units based on using the chain of links in the first table to retrieve the next hops in the second table and to forward the data units in the network based on the assembled next hops.

20 Claims, 16 Drawing Sheets

| PACKET | INGRESS LABEL | NEXT HOP REWRITE |
|---|---|---|
| 1 | 50k | 10k_inner, 20k_outer, egress ge-1/1/1.0 |
| 2 | 60k | 30k_inner, 20k_outer, egress ge-1/1/1.0 |
| 3 | 70k | 30k_inner, 10k_outer, egress s0-0/0/0.0 |
| 4 | 97k | 30k_inner, 10k_outer, egress ge-1/1/1.0 |
| 5 | 80k | 10k_outer, egress ge-1/1/1.0 |
| 6 | 90k | 20k_outer, egress so-0/0/0.0 |
| 7 | 95k | 30k_outer, egress ge-1/1/1.0 |
| 8 | 85k | 10k_outer, egress so-0/0/0.0 |
| 9 | 86k | 10k_inner, 10k_outer, egress ge-1/1/1.0 |
| 10 | 87k | 20k_inner, 20k_outer, egress ge-1/1/1.0 |
| 11 | 88k | 30k_inner, 30k_outer, egress ge-1/1/1.0 |
| 12 | 89k | 30k_inner, 30k_outer, egress so-0/0/0.0 |

805    810

(56) References Cited

U.S. PATENT DOCUMENTS

| | | | |
|---|---|---|---|
| 7,180,887 B1 * | 2/2007 | Schwaderer et al. | 370/351 |
| 7,190,696 B1 | 3/2007 | Manur et al. | |
| 7,206,315 B2 | 4/2007 | Matsuzawa et al. | |
| 7,215,637 B1 * | 5/2007 | Ferguson et al. | 370/230.1 |
| 7,254,138 B2 | 8/2007 | Sandstrom | |
| 7,292,569 B1 * | 11/2007 | Smith et al. | 370/383 |
| 7,307,991 B2 * | 12/2007 | Kubota et al. | 370/392 |
| 7,325,071 B2 | 1/2008 | Krishnan | |
| 7,362,752 B1 | 4/2008 | Kastenholz | |
| 7,397,795 B2 | 7/2008 | Liu et al. | |
| 7,398,438 B2 | 7/2008 | Agarwal et al. | |
| 7,460,481 B2 | 12/2008 | Vasseur et al. | |
| 7,512,085 B2 | 3/2009 | Fernandes et al. | |
| 7,606,148 B2 | 10/2009 | Toumura et al. | |
| 7,616,574 B2 | 11/2009 | Previdi et al. | |
| 7,616,646 B1 * | 11/2009 | Ma et al. | 370/401 |
| 7,649,904 B1 * | 1/2010 | Ghosh et al. | 370/428 |
| 7,653,044 B1 * | 1/2010 | Arad | 370/351 |
| 7,688,727 B1 * | 3/2010 | Ferguson et al. | 370/230.1 |
| 7,729,260 B2 | 6/2010 | Larsson et al. | |
| 7,898,985 B1 * | 3/2011 | Ghosh et al. | 370/254 |
| 7,986,629 B1 * | 7/2011 | Ferguson et al. | 370/235 |
| 7,990,993 B1 * | 8/2011 | Ghosh et al. | 370/428 |
| 8,014,317 B1 | 9/2011 | Ghosh et al. | |
| 8,189,576 B2 * | 5/2012 | Ferguson et al. | 370/389 |
| 8,514,744 B2 | 8/2013 | Ghosh et al. | |
| 2003/0076825 A1 | 4/2003 | Guruprasad | |
| 2005/0068948 A1 | 3/2005 | Bhardwaj | |
| 2006/0072574 A1 | 4/2006 | Akahane et al. | |
| 2006/0230150 A1 | 10/2006 | Roy | |
| 2006/0268682 A1 | 11/2006 | Vasseur | |
| 2007/0030852 A1 | 2/2007 | Szczesniak et al. | |
| 2008/0107114 A1 * | 5/2008 | Liu | 370/392 |
| 2008/0177896 A1 | 7/2008 | Quinn et al. | |
| 2009/0003349 A1 | 1/2009 | Havemann et al. | |
| 2009/0109889 A1 * | 4/2009 | Budampati et al. | 370/312 |

* cited by examiner

| PACKET | INGRESS LABEL | NEXT HOP REWRITE |
|---|---|---|
| 1 | 50k | 10k_inner, 20k_outer, egress ge-1/1/1.0 |
| 2 | 60k | 30k_inner, 20k_outer, egress ge-1/1/1.0 |
| 3 | 70k | 30k_inner, 10k_outer, egress s0-0/0/0.0 |
| 4 | 97k | 30k_inner, 10k_outer, egress ge-1/1/1.0 |
| 5 | 80k | 10k_outer, egress ge-1/1/1.0 |
| 6 | 90k | 20k_outer, egress so-0/0/0.0 |
| 7 | 95k | 30k_outer, egress ge-1/1/1.0 |
| 8 | 85k | 10k_outer, egress so-0/0/0.0 |
| 9 | 86k | 10k_inner, 10k_outer, egress ge-1/1/1.0 |
| 10 | 87k | 20k_inner, 20k_outer, egress ge-1/1/1.0 |
| 11 | 88k | 30k_inner, 30k_outer, egress ge-1/1/1.0 |
| 12 | 89k | 30k_inner, 30k_outer, egress so-0/0/0.0 |

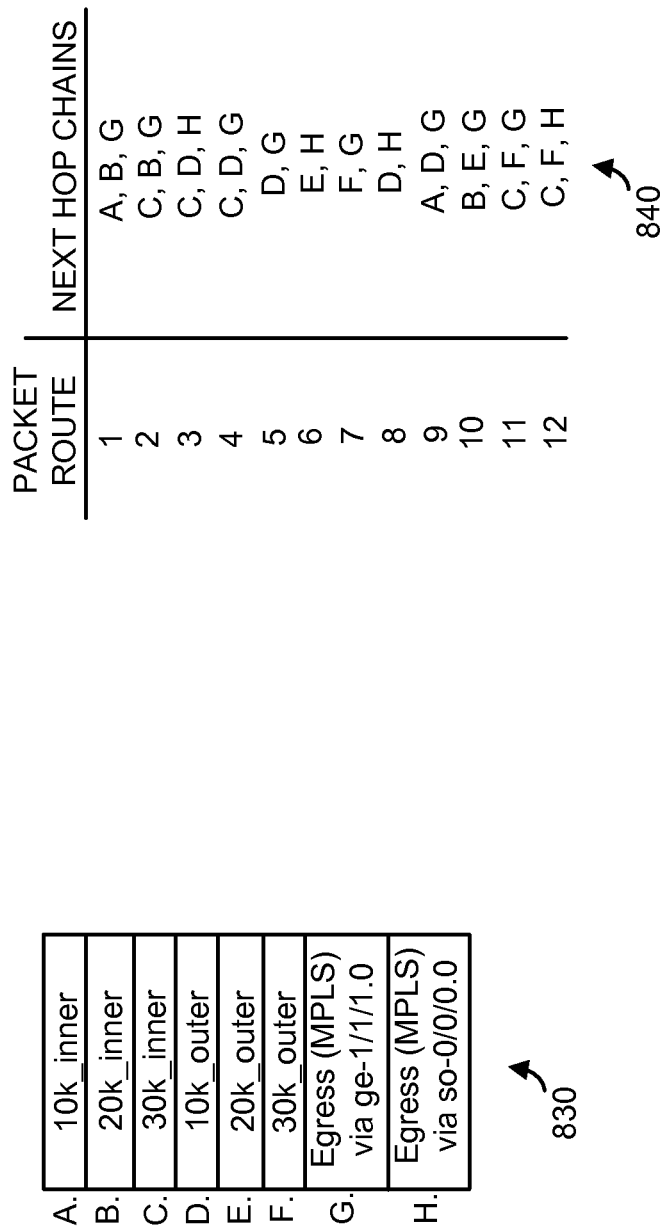

| ROUTE | NEXT HOP REWRITE |
|---|---|
| R1 | cookie-ifl1, atm-ether-address |
| R2 | cookie-ifl2, atm-ether-address |
| R3 | cookie-ifl3, atm-ether-address |

FIG. 9A

| | |
|---|---|
| A. | atm-ether-address |
| B. | cookie-ifl1 |
| C. | cookie-ifl2 |
| D. | cookie-ifl3 |

FIG. 9B

| ROUTE | NEXT-HOP REWRITE |
|---|---|
| R1 | B, A |
| R2 | C, A |
| R3 | D, A |

FIG. 9C

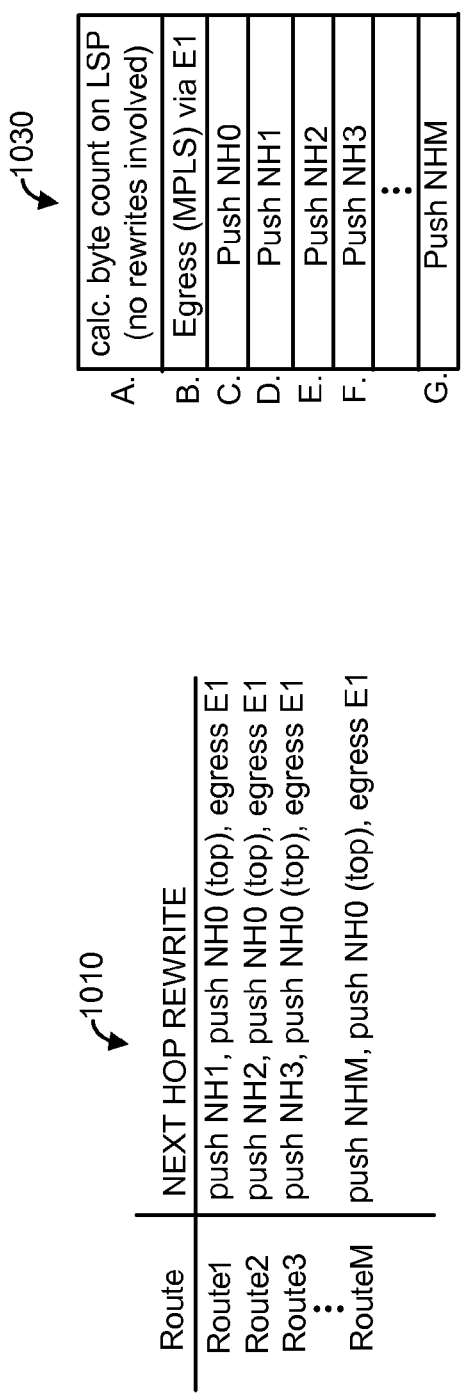
FIG. 10A
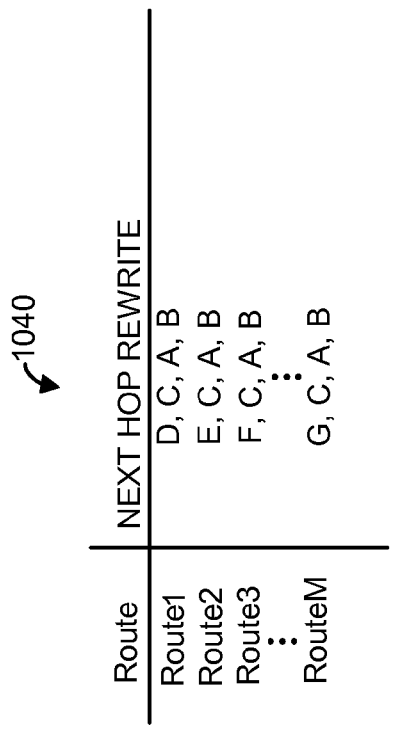
FIG. 10B
FIG. 10C

| ROUTES | NEXT HOP REWRITE ACTIONS |
|---|---|
| RT1 | push inner label 1001, push outer label 10000, egress fe000 |
| RT2 | push inner label 1002, push outer label 10000, egress fe000 |
| ... | |
| RT1000 | push inner label 2000, push outer label 10000, egress fe000 |

FIG. 11A

| ROUTES | FLAT NEXT HOP REWRITE ACTIONS |
|---|---|
| RT1 | push 1001, push 10000, police(min(B1, B2)), mark C1, egress fe000 |
| RT2 | push 1002, push 10000, police(min(B1, B2)), mark C2, egress fe000 |
| RT3 | push 1003, push 10000, police(min(B1, B2)), mark C1, egress fe000 |
| RT4 | push 1004, push 10000, police(min(B1, B2)), mark C2, egress fe000 |
| ... | |
| RT500 | push 1500, push 10000, police(B2), mark C2, egress fe000 |
| RT501 | push 1501, push 10000, police(B2), mark C2, egress fe000 |
| RT502 | push 1502, push 10000, police(B2), mark C2, egress fe000 |
| RT503 | push 1503, push 10000, police(B2), mark C1, egress fe000 |
| ... | |
| RT1000 | push 2000, push 10000, police(B2), mark C2, egress fe000 |

| NEXT HOP INDEX | NEXT HOP ACTION |
|---|---|
| N1 | egress through fe000 |
| N2 | push 10000 |
| N3 | mark C1 |
| N4 | mark C2 |
| N5 | police to B1 Mbps |
| N6 | police to B2 Mbps |
| N7 | push 1001 |
| N8 | push 1002 |
| N9 | push 1003 |
| ... | ... |
| N506 | push 1500 |
| ... | ... |
| N1006 | push 2000 |

FIG. 11D

| ROUTES | NEXT HOP CHAINS |
|---|---|
| RT1 | N7, N5, N2, N6, N3, N1 |
| RT2 | N8, N5, N2, N6, N4, N1 |
| RT3 | N9, N5, N2, N6, N3, N1 |
| RT4 | N10, N5, N2, N6, N4, N1 |
| ... | ... |
| RT500 | N506, N5, N2, N6, N4, N1 |
| RT501 | N507, N2, N6, N3, N1 |
| RT502 | N508, N2, N6, N4, N1 |
| RT503 | N509, N2, N6, N3, N1 |
| ... | ... |
| RT1000 | N1006, N2, N6, N4, N1 |

NEXT HOP CHAINING FOR FORWARDING DATA IN A NETWORK SWITCHING DEVICE

RELATED APPLICATIONS

This application is a continuation of U.S. patent application Ser. No. 13/192,216, filed Jul. 27, 2011 (now U.S. Pat. No. 8,514,744), which is a continuation of U.S. patent application Ser. No. 12/195,686, filed Aug. 21, 2008 (now U.S. Pat. No. 8,014,317), the entire contents of both applications are incorporated herein by reference.

BACKGROUND

Current networks typically include devices, such as routers, switches or gateways, which transfer or switch data, such as packets, from one or more sources to one or more destinations. A packet is one format of data in which encapsulated data can be transmitted through a network based on control information that is stored in a header portion of the packet. A router is a switching device that can receive a packet and, based on the packet header, may forward the packet towards its final destination.

Existing routers include forwarding engines for receiving and forwarding incoming packets to their intended destinations. To forward incoming packets from an input port to an appropriate output port, routers may perform complex data manipulation actions on the packet header. Such data manipulation actions frequently result in the router rewriting a portion of the packet header before transmitting the packet to an appropriate output port of the router.

SUMMARY

In accordance with one implementation, a method may include receiving a data unit and retrieving a plurality of next hops associated with the data unit based on a chained representation of the next hops in a forwarding table. The method may further include rewriting a header of the data unit based on the retrieved plurality of next hops and forwarding the data unit in the network based on the retrieved plurality of next hops.

Another aspect is directed to a network device that includes a routing engine configured to receive network topology information from a network and to, based on the network topology information, generate next hops that are relevant to routes for data units through the network. The device further includes a forwarding table stored in a memory and including a first portion of the forwarding table that stores, for each of a plurality of routes in the network, links to next hops for the route, and a second portion of the forwarding table that stores the next hops. The device further includes a forwarding engine configured to assemble the next hops for a data unit based on a lookup of the links in the first portion of the forwarding table in the second portion of the forwarding table and to forward the data unit in the network based on the assembled next hops.

Yet another aspect is directed to a device comprising a forwarding table and a forwarding engine. The forwarding table includes a first table configured to store, for each of a plurality of routes for data units in a network, a chain of links to next hops for the routes, and a second table configured to store the next hops. The device also includes a forwarding engine configured to assemble the next hops for the data units based on using the chain of links in the first table to retrieve the next hops in the second table and to forward the data units in the network based on the assembled next hops.

BRIEF DESCRIPTION OF THE DRAWINGS

The accompanying drawings, which are incorporated in and constitute a part of this specification, illustrate one or more embodiments described herein and, together with the description, explain the invention. In the drawings.

FIG. 8A is a diagram illustrating exemplary routes associated with twelve exemplary packets;

FIG. 8B is a diagram illustrating an exemplary next hop table;

FIG. 8C is a diagram illustrating an exemplary next hop logical chain table;

FIG. 9A is a diagram illustrating three exemplary routes associated with Ethernet over ATM transmission.

FIG. 9B is a diagram illustrating an exemplary next hop table constructed based on next hop rewrites;

FIG. 9C is a diagram illustrating an exemplary next hop logical chain table;

FIG. 10A is a diagram illustrating exemplary routes;

FIG. 10B is a diagram illustrating an exemplary next hop table constructed based on next hop rewrites;

FIG. 10C is a diagram illustrating an exemplary next hop logical chain table.

FIG. 11A is another diagram illustrating exemplary routes;

FIG. 11B is a diagram illustrating a series of routes represented using a flat, non-chained representation for next hops;

FIG. 11C is a diagram illustrating an exemplary next hop table based on the routes shown in FIG. 11A; and FIG. 11D is a diagram illustrating an exemplary next hop logical chain table for the routes shown in FIG. 11A.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

A route for a data unit through a network may be defined based on a number of next hops. Exemplary embodiments described herein may implement a router forwarding table as a chained list of references to next hops. In contrast to a flat forwarding table, where there is a single next hop associated with each route, and that single next hop's rewrite contains the entire re-write transformation performed on headers of data units corresponding to the route, using a chained list of references to next hops can reduce the memory requirements to store the forwarding table and can lead to a reduced time to update the state of the forwarding table in response to a network disturbance.

A "next hop," as this term is used herein, may include an elementary action performed for a packet as it transits a router. Examples of elementary actions include replacing a layer 2 (L2) header of a data unit, performing a layer 3 (L3) action (e.g., network address translation (NAT)) on the data unit, or making a copy of the data unit (replication for sampling)). Some packets may also be associated with multiple network hops, referred to as a "composite next hop," where this term refers to a commonly referenced collection of other next hops (e.g., a collection of next hops) and a function to be performed on those next hops (e.g., C=F(N1, N2, . . . Nn), where C is the composite next hop, F is the function and {N1, N2, . . . , Nn} is the collection of next hops that the function is acting upon). Examples of the function (F) may include (but is not limited to): 1) perform any one of the actions of the next hops in the composite next hop; 2) perform all of the actions sequentially of the next hops in the composite next hop; 3) perform the actions of the next hops until some condition CON evaluates to true (alternatively to false) and then transit the data unit, or take a different set of actions; or 4) make copies of the data unit and perform the action on all of the copies.

Exemplary System

Figure 1:
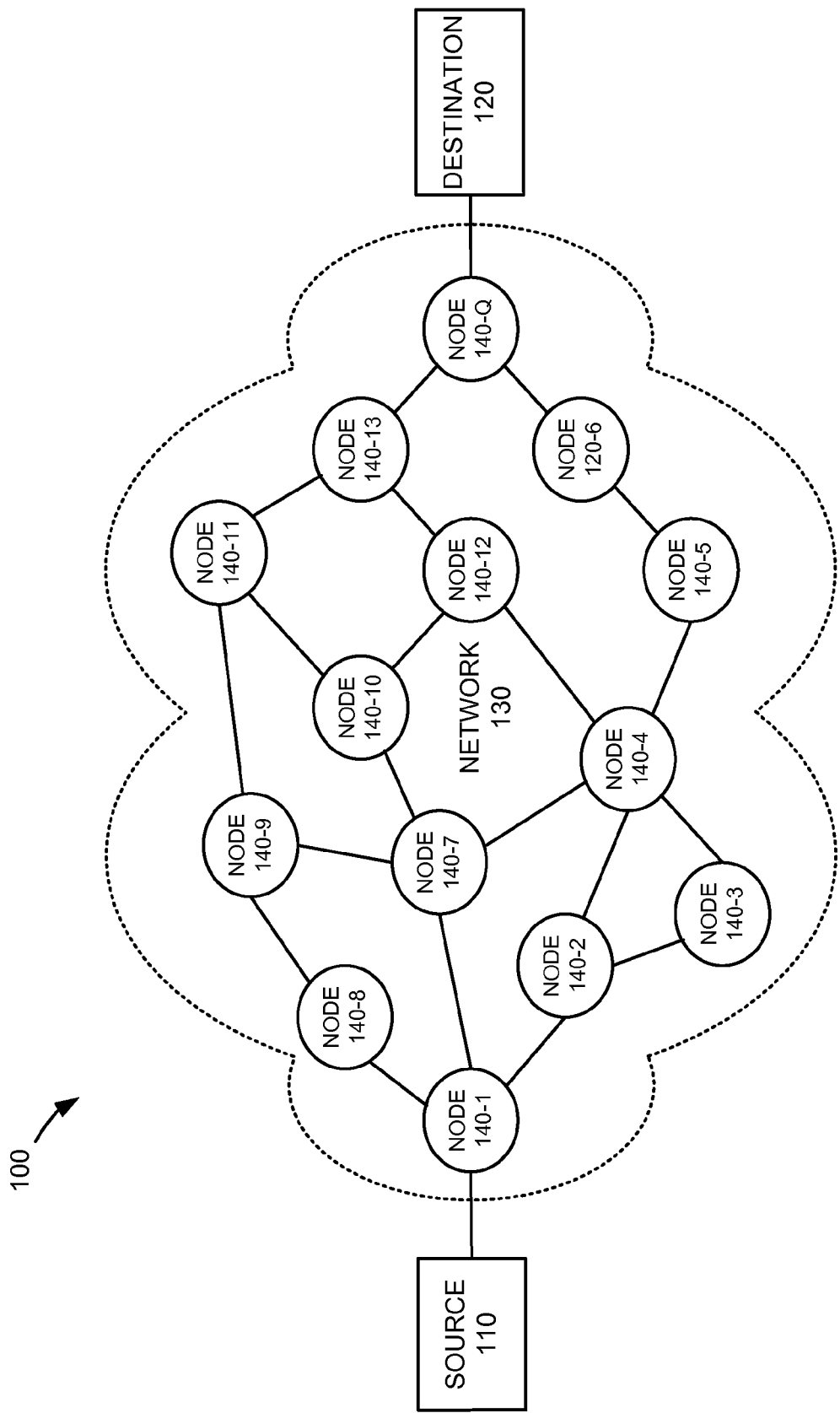
FIG. 1 is a diagram of an exemplary network.

FIG. 1 illustrates a system 100 according to an exemplary embodiment for transmitting data units between a source node 110 and a destination node 120. A "data unit," as this term is used herein, may represent a packet or another fixed or variable length unit of data (e.g., a frame).

System 100 may include a source node 110 and a destination node 120 connected via a network 130. Source node 110 and destination node 120 may each include, for example, a server or a client computing device. Source node 110 and destination node 120 may connect with network 130 via wired, wireless or optical connection links. Network 130 may include one or more networks of any type, including a local area network (LAN), metropolitan area network (MAN), wide area network (WAN), Internet, or Intranet. Network 130 may include any number of network nodes for routing data units through network 130, with multiple nodes 140-1 through 140-Q (generically and individually referred to herein as a "node 140-x") shown in FIG. 1 by way of example. Each network node 140-x may include a network device, such as, for example, a router, a switch, or a gateway, that routes or switches incoming data units towards one or more destinations. Data units that originate at source node 110 may be routed to destination node 120 via multiple ones of nodes 140-1 through 140-Q.

The number and configuration of nodes depicted in FIG. 1 is for illustrative purposes only. A network may include different, more or fewer nodes than are illustrated in FIG. 1. Additionally, only a single source node 110 and destination node 120 have been shown in FIG. 1 for purposes of simplicity. However, multiple source nodes and destination nodes may be coupled to network 130.

In general, data units sent by source node 110 and destined for destination node 120 may traverse network 130 by passing from one node to another until the data unit has reached its destination. As the data unit traverses network 130, each node 140-x that receives the data unit may make a decision as to which node the data unit should next be forwarded. When routing data through a network such as network 130, nodes in the network may follow a routing protocol that attempts to maximize the efficiency of the network by choosing the "best" route for the data unit through network 130.

Exemplary Network Node

Figure 2A:
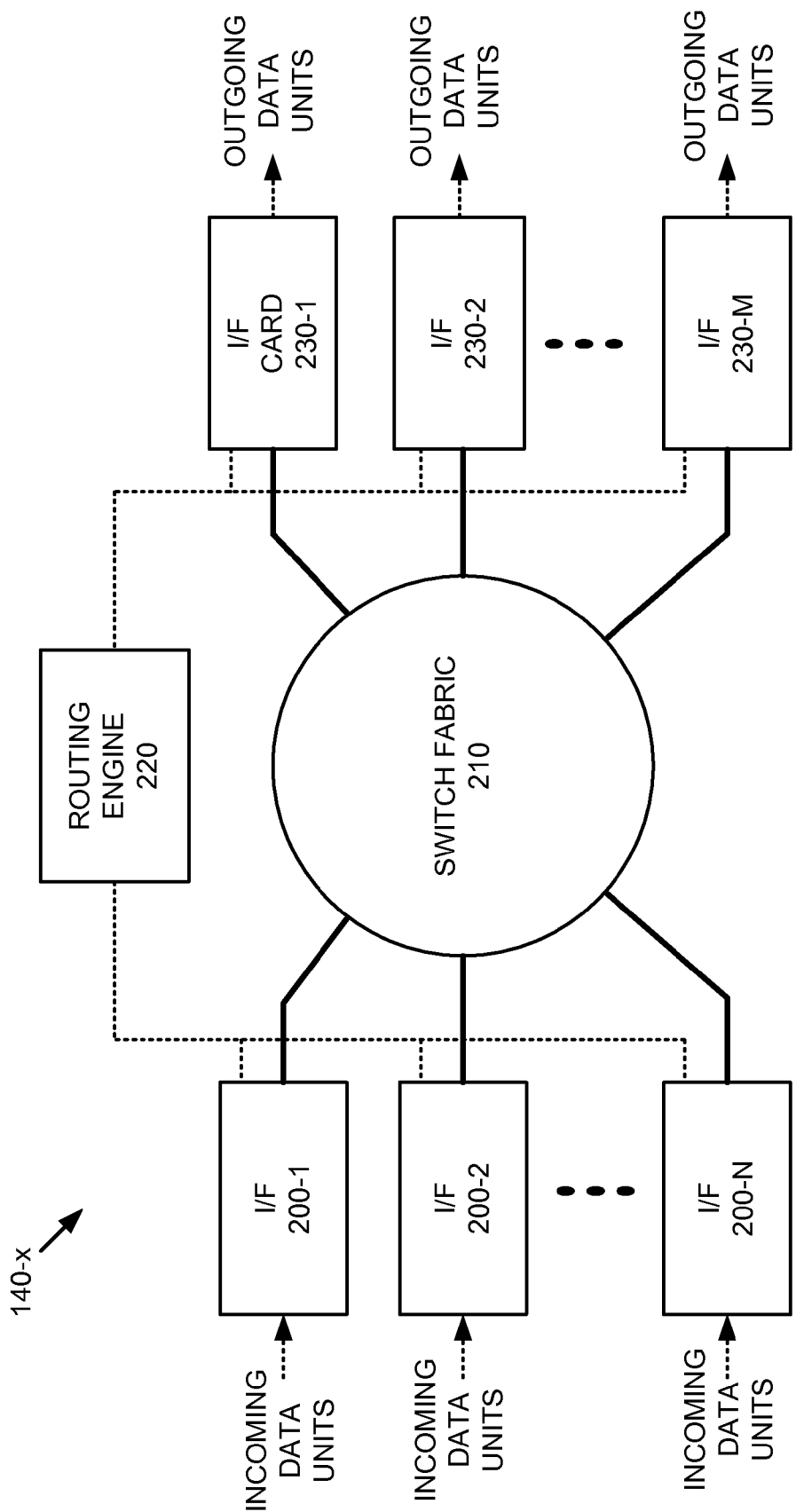
FIG. 2A is a diagram of a network node according to an exemplary implementation.

FIG. 2A illustrates a network node 140-x according to an exemplary implementation in which network node 140-x is a router. Network node 140-x may receive one or more data units from one or more incoming physical links, process the data units to determine destination information, and transmit the data units on one or more outgoing links in accordance with the destination information or one or more other properties of the data units. The data units may include packets, cells, or datagrams; fragments of packets, cells, or datagrams; or other types of data. The one or more incoming physical links and the one or more outgoing links may connect to other nodes or edge devices in network 130.

Network node 140-x may include one or more ingress interfaces 200-1 through 200-N (generically and individually referred to herein as an "ingress interface 200"), a switch fabric 210, a routing engine 220, and one or more egress interfaces 230-1 through 230-M (generically and individually referred to herein as an "egress interface 230"). Each ingress interface 200 may receive data units from network 130 via one or more physical links and may forward the received data units through switch fabric 210 to a respective egress interface. Each ingress interface 200 may forward received data units to a respective egress interface 230 using forwarding tables received from routing engine 220. Routing engine 220 may communicate with other of nodes 140-1 through 140-Q connected to network node 140-x to exchange information regarding network topology. Routing engine 220 may create routing tables based on the network topology information and forward the routing tables to each ingress interface 200 and each egress interface 230. Routing engine 220 may also perform other general control and monitoring functions for network node 140-x.

Switch fabric 210 may include one or more switching planes to facilitate communication between ingress interface 200-1 through 200-N and egress interfaces 230-1 through 230-M. In one exemplary implementation, each of the switching planes may include a three-stage switch of crossbar elements. Other types of switching planes may, however, be used in switch fabric 210. Egress interfaces 230-1 through 230-M may receive data units from switch fabric 210 and may forward the data units towards destinations in the network via one or more outgoing physical links.

Network node 140-x may include fewer, additional and/or different components than are shown in FIG. 2A. For example, network node 140-x may include one or more intermediate service cards (not shown) that connect to switch fabric 210 and which may include special purpose cards that perform various specialized functions. For example, the intermediate service cards may include a firewall service card, an intrusion detection service card, an encryption/decryption service card, or other types of special purpose cards.

The interfaces in FIG. 2A have been arbitrarily designated as "ingress interfaces" or "egress interfaces" for purposes of illustration. Each one of interfaces 200-1 through 200-N or 230-1 through 230-M may act as an ingress and/or an egress interface. Thus, each one of interfaces 200-1 through 200-N or 230-1 through 230-M may receive data units from the external network, or forward data units received from switch fabric 210 towards destinations in network 130.

Figure 2B:
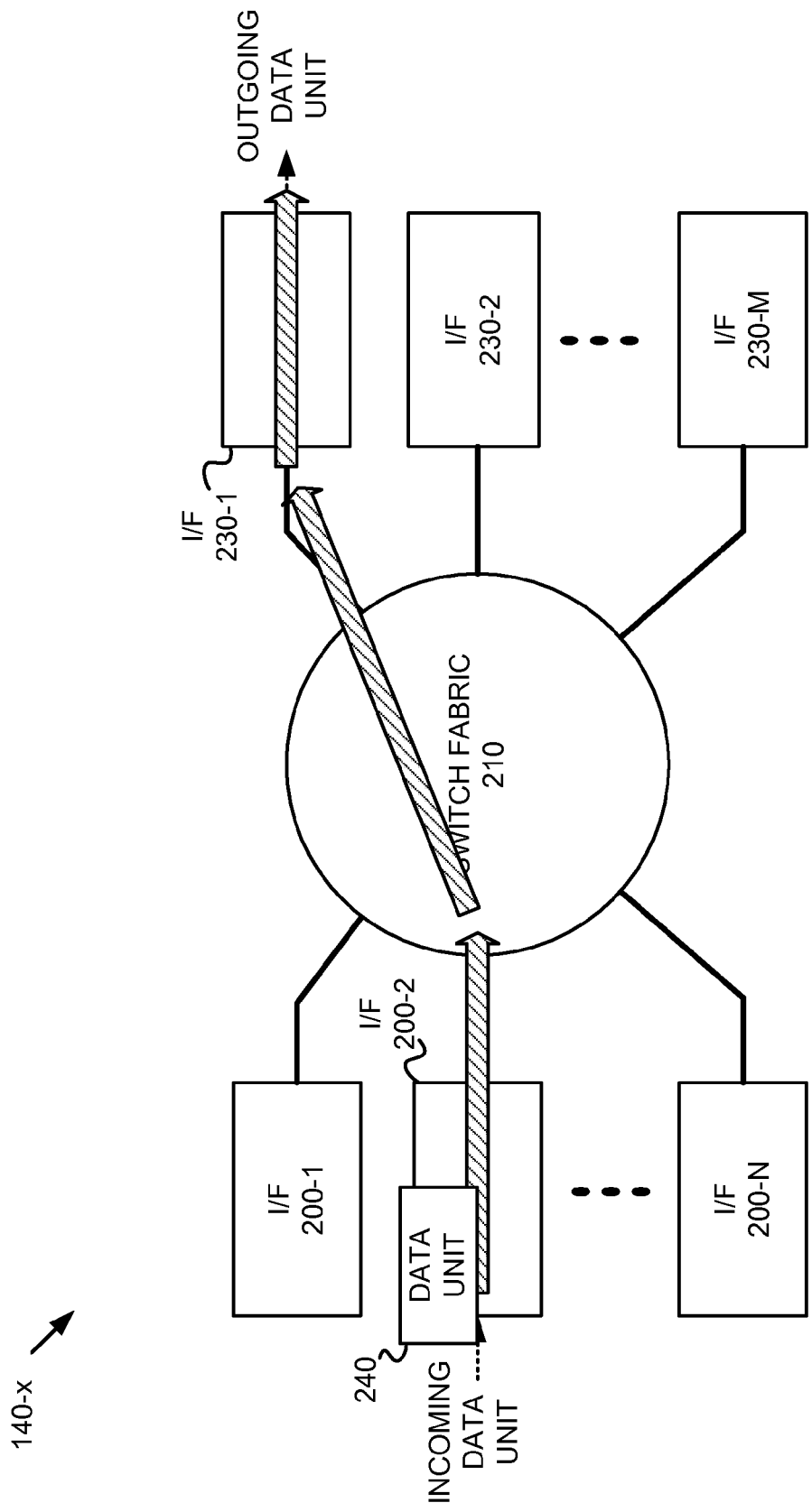
FIGS. 2B, 2C and 2D are diagrams of exemplary paths data units may take when traversing the exemplary network node of FIG. 2A.
Figure 2C:
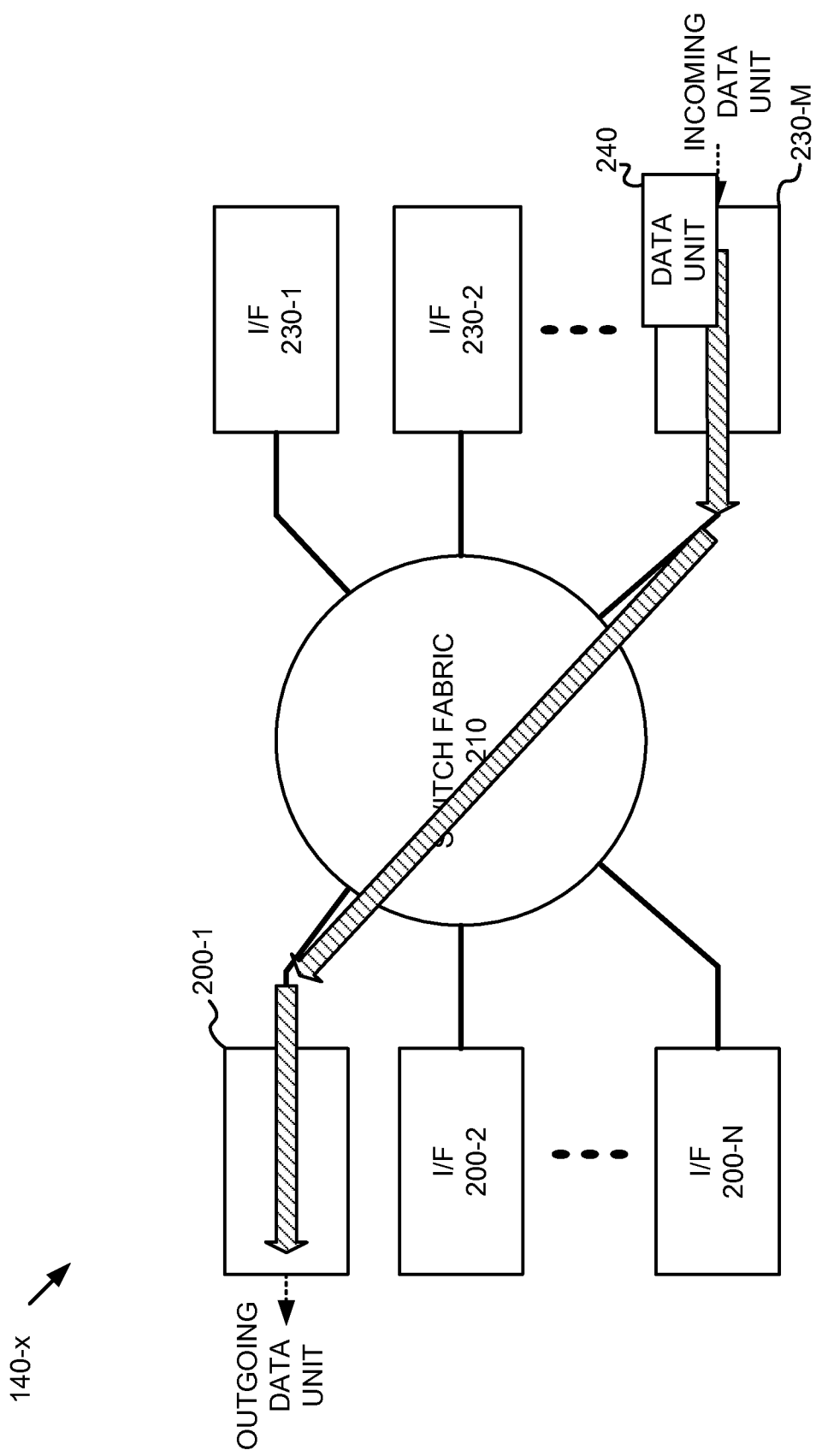
Figure 2D:
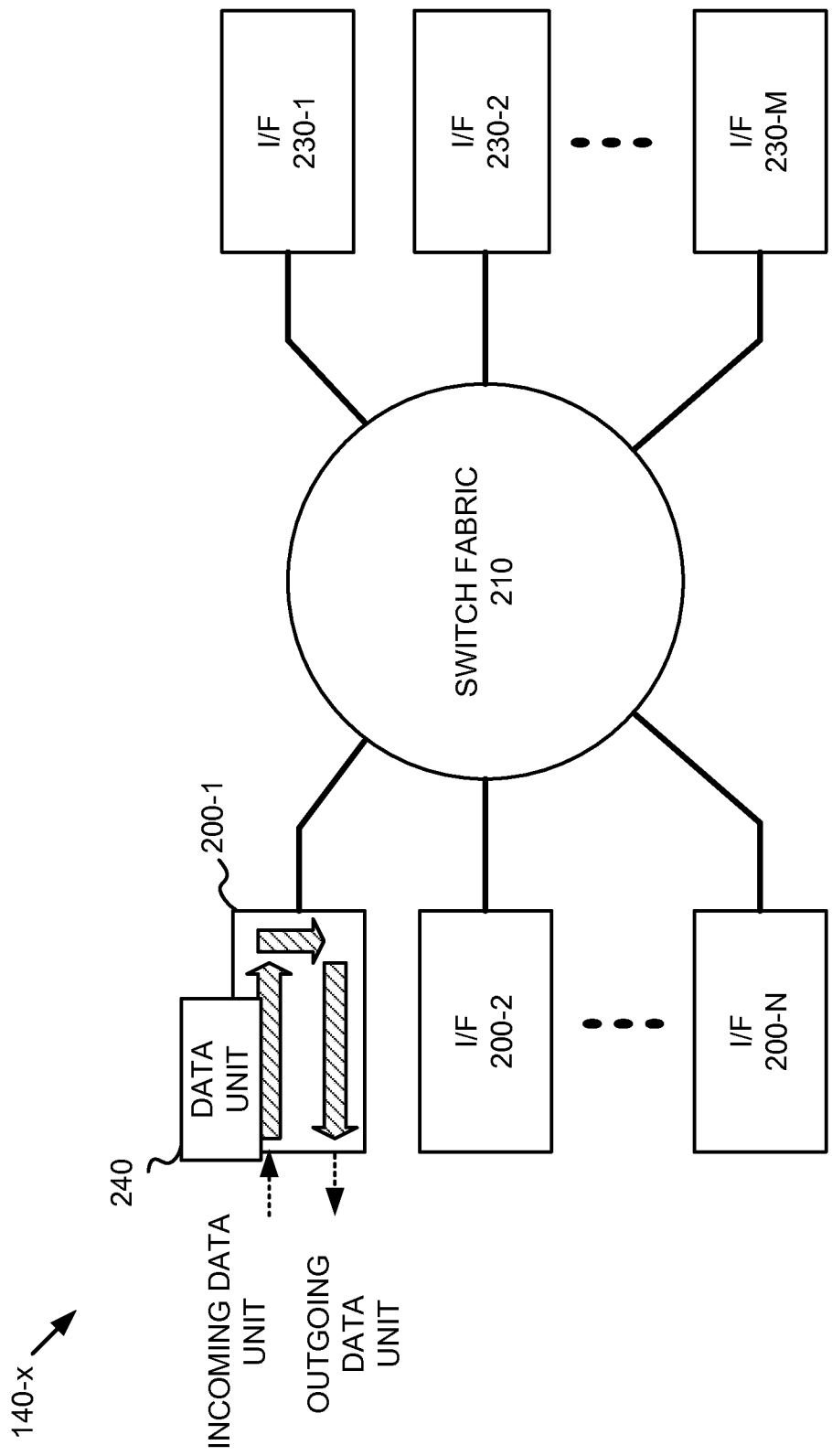

FIGS. 2B, 2C and 2D illustrate examples of interfaces 200 and 230 acting as both ingress and egress interfaces, and examples of paths through network device 140-x that includes interfaces 200 and/or 230. As shown in the example of FIG. 2B, a data unit 240 may be received at an interface 200-2, acting as an ingress interface, from external network 130 and data unit 240 may be forwarded to an interface 230-1, acting as an egress interface, via switch fabric 210. Interface 230-1 may forward data unit 240 towards its destination in the external network 130 via an outgoing link.

As further shown in the example of FIG. 2C, a data unit 240 may be received at an interface 230-M, acting as an ingress interface, from external network 130 and data unit 240 may be forwarded to an interface 200-1, acting as an egress interface, via switch fabric 210. Interface 200-1 may forward data unit 240 towards its destination in external network 130 via an outgoing link.

As also shown in the example of FIG. 2D, data unit 240 may be received at interface 200-1, acting as an ingress interface, from external network 130. Interface 200-1 may then forward data unit 240 towards its destination in external network 130 via the same link from which the data unit was received. Interface 200-1, thus, in this example, acts as both an ingress interface and an egress interface for the same data unit.

Exemplary Interface

Figure 3:
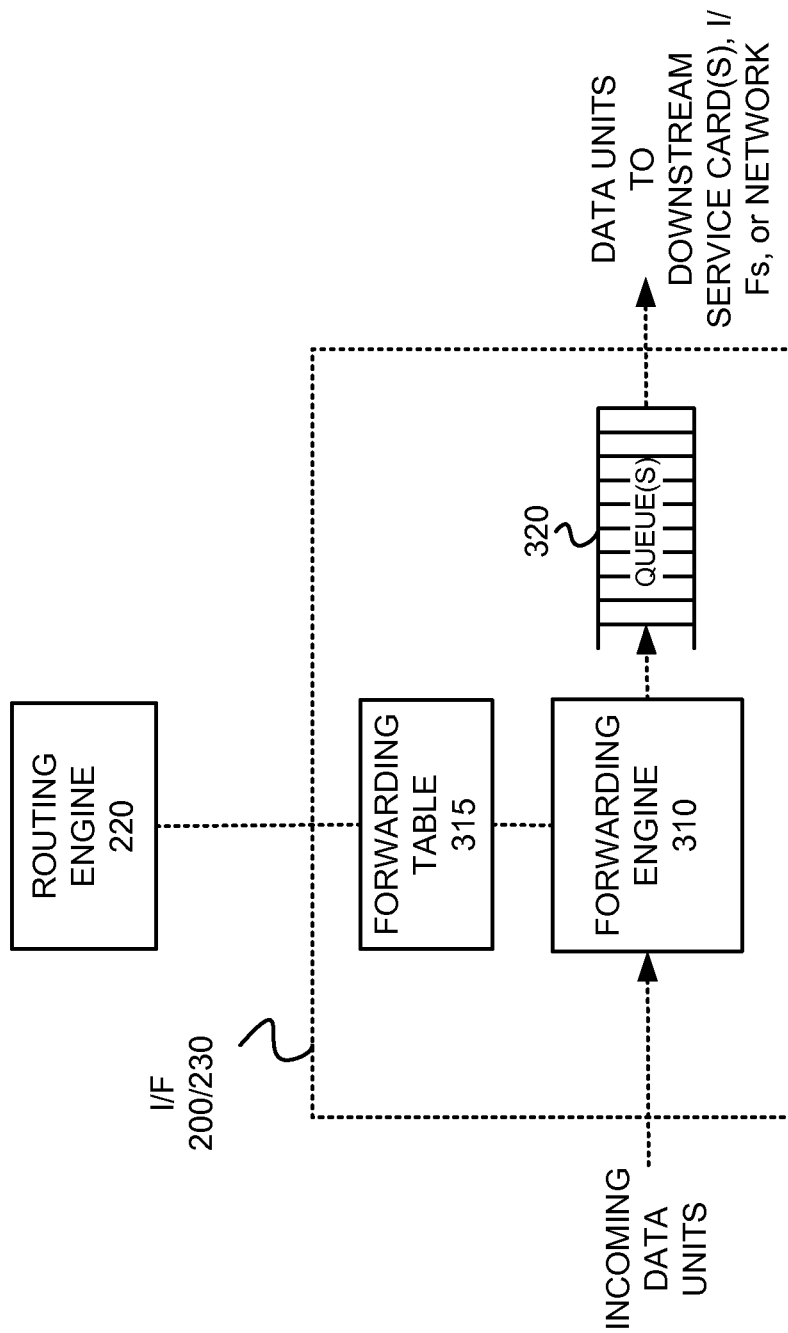
FIG. 3 is a diagram of an exemplary configuration of an interface of the network node of FIG. 2A.

FIG. 3 illustrates exemplary components of an interface 200/230. As shown in FIG. 3, interface 200/230 may include a forwarding engine 310, a forwarding table 315, and one or more queues 320. FIG. 3 further depicts routing engine 220 being connected to interface 200/230. Routing engine 220 may supply the contents of forwarding table 315 to interface 200/230 based on network topology information.

Forwarding engine 310 may receive data units from switch fabric 210, or from a physical link connected to network 130 and may inspect one or more properties (e.g., information contained in a header) of each data unit, retrieve next hop information from forwarding table 315, rewrite (modify) portions of the header of each data unit based on the next hop information, and forward the data unit to the next node in network 130. Queue(s) 320 may be used to buffer data units before they are sent through switch fabric 210 or to an external link. Interface 200/230 may, in some implementations, include fewer, additional or different components than those shown in FIG. 3.

Exemplary Data Unit

Figure 4:
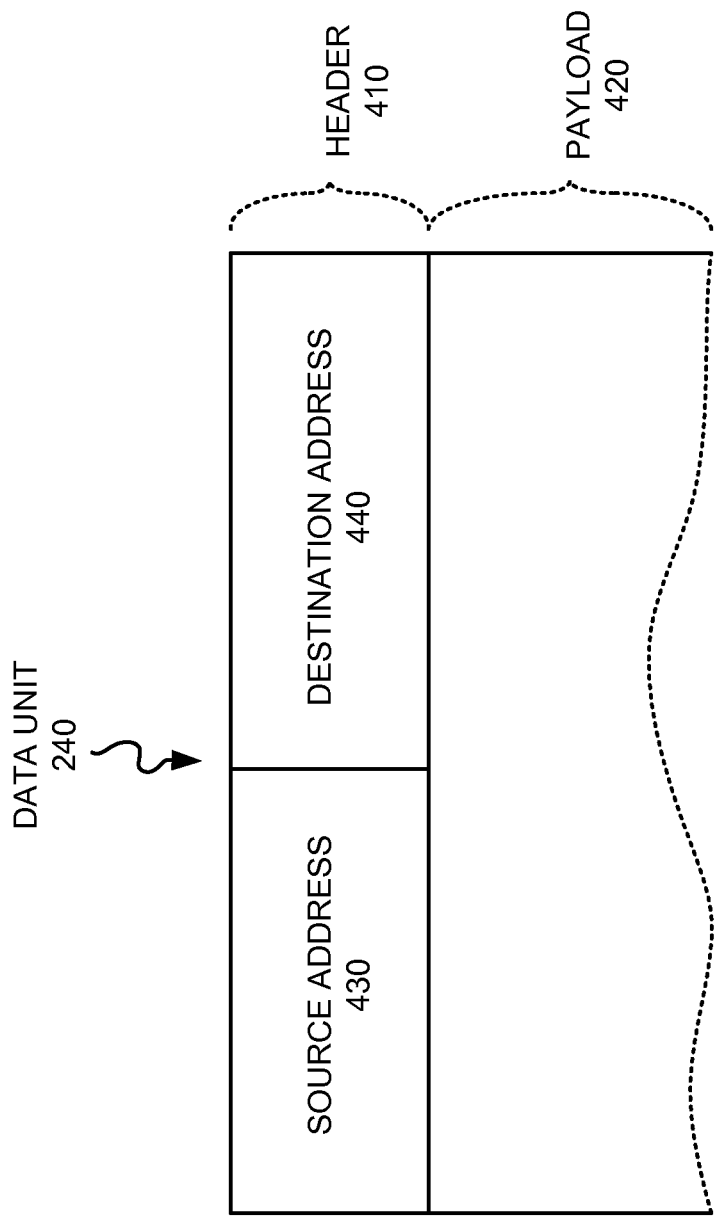
FIG. 4 is an exemplary diagram of a data unit that may traverse the network of FIG. 1 from a source to a destination.

FIG. 4 illustrates an exemplary data unit 240 that may originate at source node 110 and may be sent to destination node 120 via multiple ones of nodes 140-1 through 140-Q of network 130. Data unit 240, as shown in FIG. 4, depicts exemplary contents of the data unit at an intermediate node (e.g., one of nodes 140-1 through 140-Q) of network 130 as data unit 240 is being forwarded node by node towards destination node 120. Data unit 240 may include, among other data, a header 410 and a payload 420. Header 410 may include a source address 430 and a destination address 440. The source address 430, destination address 440, or other portions of header 410 may include information relating to a number of different protocols, possibly at a number of different layers of a networking model. For example, header 410 may contain layer 2 and layer 3 information of the Open Systems Interconnection (OSI) seven layer model. Header 410 may be rewritten at one or more of nodes 140. Thus, each node 140 that receives data unit 240 may examine header 410 and rewrite one or more portions of header 410 before sending data unit 240 to the next node in network 130.

Source and destination addresses, either as received by node 140 and in header 410, or after processing by node 140, may be represented as one or more next hops that are relevant to the data unit's route through network 130. The next hops may, in some situations, be represented as a composite next hop that includes a function that is to be applied to the next hop(s).

Exemplary Forwarding Table

Figure 5:
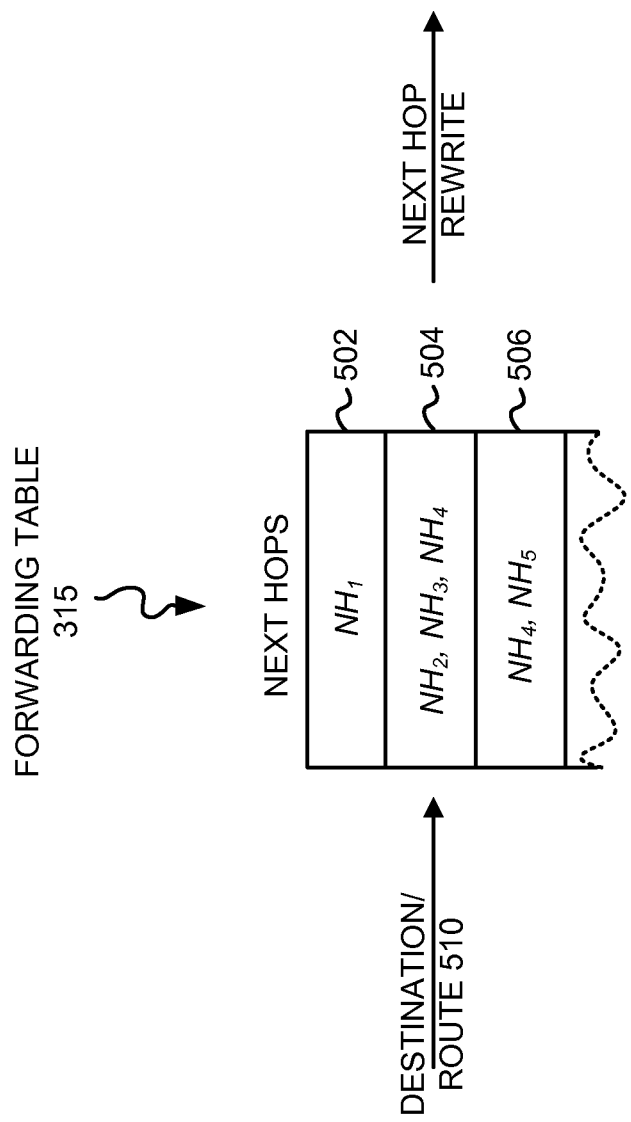
FIG. 5 is a diagram of a forwarding table according to an exemplary implementation.

FIG. 5 is a diagram conceptually illustrating forwarding table 315 according to an exemplary implementation. Forwarding table 315 may include, for each possible destination or route 510 of data units received by the node, one of more next hops (or a composite next hop) that may be used to determine the egress interface(s) 230 for the data unit and the information used to rewrite the header of the data unit, called the "next hop rewrite" herein. Destination/route 510 may be obtained based on the header of the incoming data unit and may define the final destination, as well as possibly the path (route) that the data unit is to take to get to the final destination. Forwarding engine 310 may use the next hops stored in forwarding table 315, and, based on the composite next hop, may obtain the next hop rewrite for the data unit.

A number of sets of next hops are shown in FIG. 5. For example, in FIG. 5, next hop 502 is shown as a single next hop while next hops 504 and 506 include multiple next hops. More specifically, next hop 502 is defined by the next hop labeled $NH_1$, next hops 504 are defined as the next hops labeled $NH_2$, $NH_3$, and $NH_4$, and next hops 506 are defined as the next hops labeled $NH_4$ and $NH_5$.

As previously mentioned, each next hop, such as next hops $NH_1$, $NH_2$, $NH_3$, NH4, and $NH_5$ may represent an elementary action that is to be performed on the data unit. A composite next hop could also be defined as one or more next hops and a function that is to be performed on them. The next hops and/or next hop composition defined in forwarding table 315 may be used by forwarding engine 310 to generate the next hop rewrite information for the data unit. The next hop rewrite information may define, for example, rewriting of layer 2 and layer 3 information in the header. For example, when an incoming destination/route 510 corresponds to next hops 504, the header of the data unit corresponding to destination/route 510 may be rewritten to include rewrite information for each of next hops $NH_2$, $NH_3$, and $NH_4$.

Existing forwarding tables may be physically constructed as a "flat" forwarding table in which each destination/route 510 corresponds to a single next hop rewrite action. In such a flat forwarding table, next hop NH4, for example, may be physically stored in the memory used to store next hops 504 and the memory used to store next hops 506. Such a flat forwarding table can require a relatively large memory and can take a relatively long time to update when there is a network disturbance, since if NH4 is replaced by a new next hop, e.g., NH10, all of these 'copies' of NH4 in next hops 504, 506, etc., will be updated to NH10.

Consistent with aspects described herein, forwarding table 315 may be constructed as a chained data structure in which individual next hops in forwarding table 315 may be stored as a link to the next hop. A full next hop rewrite may be formed by the assembled chain of next hops, which may each correspond to a partial rewrite. The next hop chaining may be implemented as a composition function for a composite next hop. In this manner, next hops for a data unit may be evaluated from forwarding table 315 as links to a chain of individual next hops to obtain the next hop rewrite for the data unit.

Figure 6:
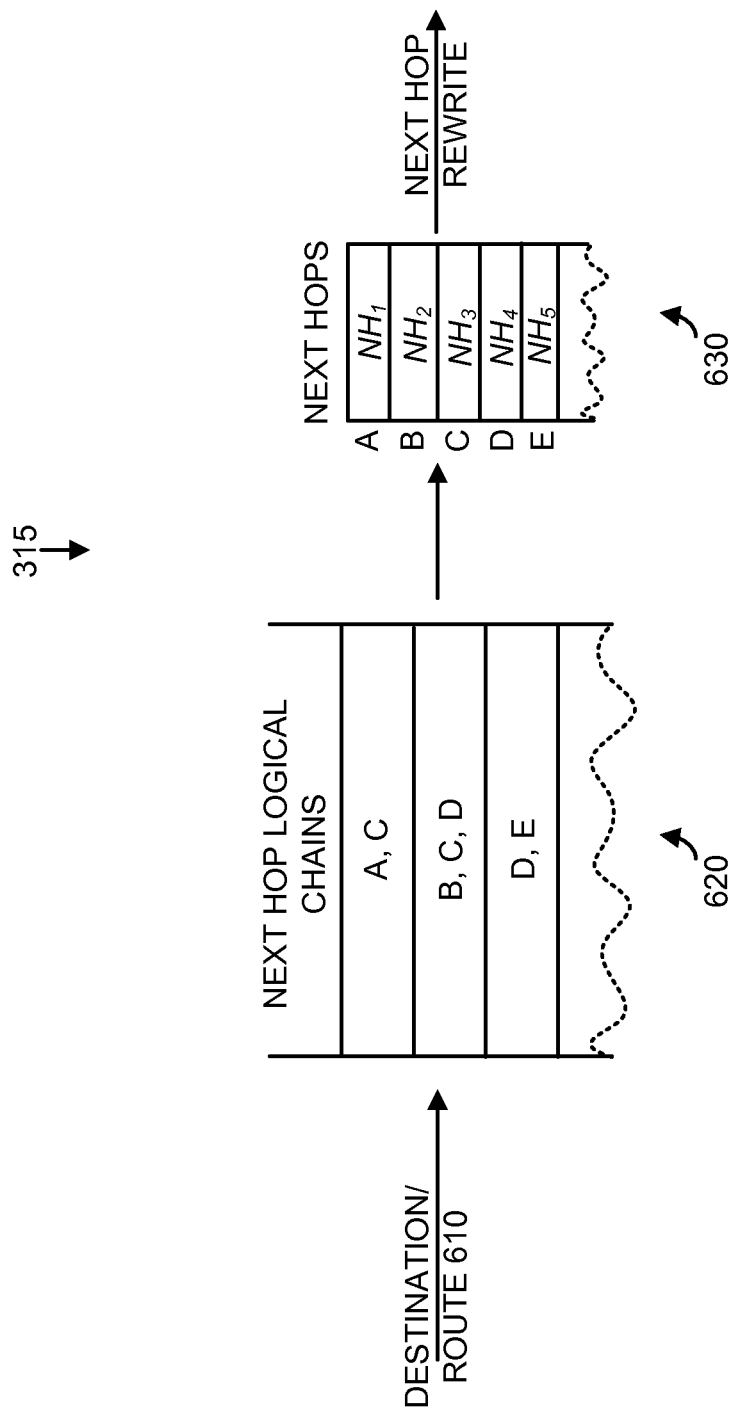
FIG. 6 is a diagram illustrating an exemplary implementation of a forwarding table using next hop chaining.

FIG. 6 is a diagram illustrating an exemplary implementation of forwarding table 315 using next hop chaining In this implementation, forwarding table is implemented using a next hop logical chain table 620 and a next hop table 630. Next hop logical chain table 620, instead of storing the actual values associated with each of the next hops (i.e., $NH_1$, $NH_2, \ldots NH_5$) may instead store a link to the next hops. In next hop logical chain table 620, link A is a link to $NH_1$, link B is a link to $NH_2$, link C is a link to $NH_3$, link D is a link to $NH_4$, and link E is a link to $NH_5$. Each entry (row) in next hop logical chain table 620 may be indexed by a destination/route 510 corresponding to an incoming data unit to obtain one or more links corresponding to the composite next hop for the data unit. Next hop table 630 may store the actual next hops. Thus, each next hop link in next hop logical chain table 620 may be used to index next hop table 630 to obtain the next hop. Forwarding engine 310 may then apply the composite function to chain together multiple next hops and obtain the next hop rewrite for the data unit. For example, if incoming destination/route 610 refers to next hop links B, C, D in next hop logical chain table 620, forwarding engine 310 may lookup the next hops corresponding to links B, C, and D in next hop table 630 and chain the partial rewrite results together to produce an output next hop rewrite that represents a chaining composition based on $NH_2$, $NH_3$, $NH_4$.

It can be appreciated that the architecture shown in FIG. 6 for forwarding table 315 is one example for implementing a chained representation of composite next hops in a forwarding table. Other designs, such as other designs using other types of look-up tables or other structures may alternatively be used.

Figure 7:
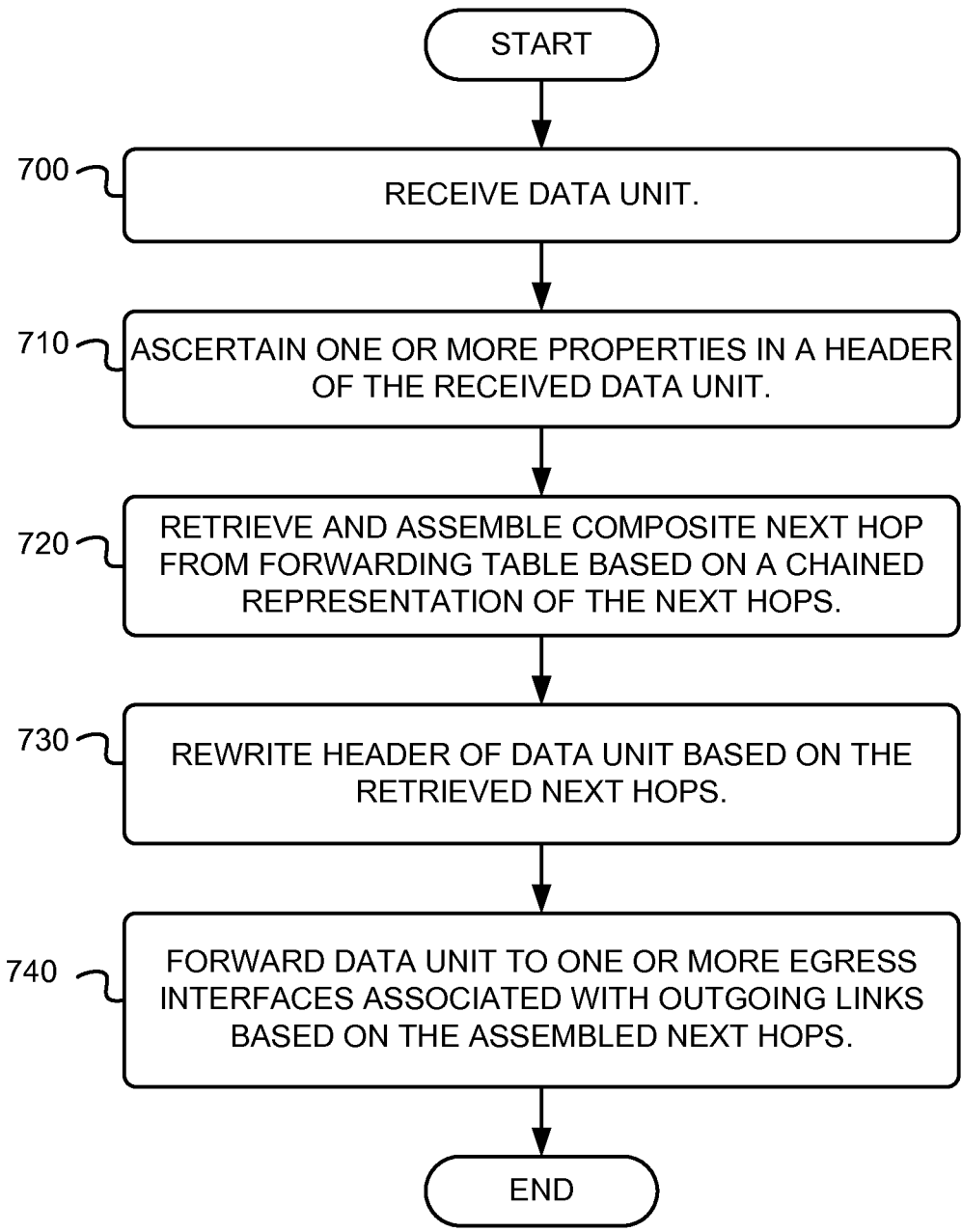
FIG. 7 is a flowchart of an exemplary process for forwarding data units based on a chained representation of composite next hops.

FIG. 7 is a flowchart of an exemplary process for forwarding data units based on a chained representation of next hops. The exemplary process of FIG. 7 may be performed by a forwarding engine 310 associated with each interface 200/230 of network node 140-x.

The exemplary process may begin with the receipt of a data unit (block 700). An incoming data unit from network 130 may be received at forwarding engine 310 of interface 200/230 via, for example, a physical link. One or more properties in a header of the received data unit may be ascertained (block 710). For example, a destination address or route corresponding to the data unit may be retrieved. A composite next hop may be retrieved and assembled from forwarding table 315 based on a chained representation of the next hops (block 720). As described above, the next hops may be obtained from forwarding table 315 by a lookup operation that obtains links to multiple next hops and chains them together to form a composite next hop. The header of data unit 240 may next be rewritten based on a rewrite string obtained from the assembled next hop (block 730). The data unit may be forwarded to one or more egress interfaces associated with outgoing links based on the assembled next hops (block 740).

The chained assembly of next hops, as described above, can provide for a number of advantages. For instance, by storing a single copy of a next hop for multiple destinations/routes, memory requirements of the forwarding table can be reduced. Additionally, if there is a network outage or disruption causing a next hop to be changed by routing engine 220, only a single copy of the next hop may need to be changed instead of potentially needing to update many copies of the next hop.

Examples of Next Hop Chaining

To further illustrate certain of the concepts described above, exemplary situations involving next hop chaining will next be described.

Assume a series of MPLS (multi-protocol label switching) packets are received by a node 140. FIG. 8A is a diagram illustrating exemplary routes associated with twelve exemplary MPLS packets, labeled as packets one through twelve in FIG. 8A. Each packet may be associated with an ingress label 805 and a next hop rewrite 810. Here, each next hop rewrite 810 is shown as one or two MPLS labels and an identification of the output port for the packet. Each MPLS label and output port may correspond to a next hop for the packet and are separated in FIG. 8A with commas. As previously discussed, each next hop rewrite 810 may be determined by node 140 based on the next hop or next hops retrieved from forwarding table 315.

If forwarding table 315 was implemented as a flat data structure, each next hop rewrite may be separately stored in forwarding table 315. This can result in relatively large memory usage. Additionally, if a single next hop needs to be updated in forwarding table 315, each instance of that next hop may need to be located and updated. For example, assume a physical link in the network fails and this failed physical link was associated with the label "$10k$_inner." In this situation, each instance of "$10k$_inner" may need to be located and updated in forwarding table 315 to reflect new routes for the effected packets. In a large forwarding table, locating and updating each instance of the label in the forwarding table can take a significant amount of time.

FIG. 8B is a diagram illustrating an exemplary next hop table 830, similar to next hop table 630 (FIG. 6), constructed based on next hop rewrites 810. Eight rows, labeled A through H, are stored in next hop table 830. Each next hop may represent an elemental next hop from the next hop rewrite 810. In this MPLS example, each elemental next hop is shown as an MPLS label or egress port identification. Identical MPLS labels that appear in different contexts may be separately stored in next hop table 830. For example, a MPLS tunnel label and VPN label may be stored separately in next hop table 830 even if both labels have the same value. In FIG. 8B, for instance, the label "$10k$" may be used in different MPLS contexts, denoted in next hop table 830 as "inner" and "outer," and thus this label is stored in both row A and D in next hop table 830. Similarly, the MPLS label "$20k$" is stored in both rows B and E and the label "$30k$" is stored in both rows C and F.

FIG. 8C is a diagram illustrating an exemplary next hop logical chain table 840, similar to next hop logical chain table 640 (FIG. 6), constructed based on next hop rewrites 810. Each row in next hop table 840 may include a logical list of the next hops for the route corresponding to packets 1-12. The logical list of next hops may be expressed, for example, as indexes pointing to the corresponding row in next hop table 830.

As another example of next hop chaining, consider the situation in which Ethernet data is sent over ATM (Asynchronous Transfer Mode). In such a situation, each rewrite may be an L2 rewrite of the form: <atm-cookie><atm-ether-address>. The "<atm-cookie>" portion of each rewrite may be distinct for each route while the "<atm-ether-address>" may be the same for groups of routes.

FIG. 9A is a diagram illustrating three exemplary routes associated with Ethernet over ATM transmission. Next hop rewrites 910 are shown for each of three routes R1, R2, and R3. Each route includes a next hop labeled "cookie-if1" portion that is distinct for each route and a common "atm-etheraddress" next hop.

FIG. 9B is a diagram illustrating an exemplary next hop table 930 constructed based on next hop rewrites 910. Four rows, labeled A through D, are shown in next hop table 930. Here, even though there are four entries in next hop table 930 and only three in the "full" rewrite table 910, memory usage can still be reduced as each entry in next hop table 930 may take up less memory than each next hop rewrite 910.

FIG. 9C is a diagram illustrating an exemplary next hop logical chain table 940, similar to next hop logical chain table 640 (FIG. 6), constructed based on next hop rewrites 910. Each row in next hop table 940 may include a logical list of the next hops for routes R1, R2, and R3. The logical list of next hops may be expressed, for example, as indexes pointing to the corresponding row in next hop table 930.

As yet another example of next hop chaining, consider the situation in which next hop chaining is used to tabulate actions relevant to a partial next hop. With chaining of next hops, it may be possible to associate a statistical action with only the partial next hop that is relevant to the statistical action.

FIG. 10A is a diagram illustrating exemplary routes. Next hop rewrites 1010 are shown for each of four routes Route1, Route2, Route3, and RouteM. Each route includes a next hop labeled one of NH1 through NHM and a next hop labeled NH0. Next hops NH1 through NHM may correspond to VPN labels and NH0 may correspond to the transport layer. Next hop egress E1 may correspond to the router egress re-write.

FIG. 10B is a diagram illustrating an exemplary next hop table 1030 constructed based on next hop rewrites 1010. Six rows, labeled A through G, are shown in next hop table 1030. Row A may represent an action not related to a header rewrite, such as, in this case, a next hop action that calculates a byte count. In other words, row A may represent a "statistics gathering" next hop action. This next hop may be inserted into the chain of next hop rewrites.

FIG. 10C is a diagram illustrating an exemplary next hop logical chain table 1040, similar to next hop logical chain table 640 (FIG. 6), constructed based on next hop rewrites 1010. Each row in next hop table 1040 may include a logical list of the next hops corresponding to routes Route1, Route2, Route3, and RouteM. Additionally, in this example, a link to next hop A is also included in the routes. In this manner, statistics may be gathered as part of the next hop rewrite operation.

In contrast, without next hop chaining, because the partial next hops do not have an independent existence, it may not be possible to gather statistics relating to a single partial next hop. For instance, if statistics were desired for routes in which the NH1 next hop was present, it may be necessary to gather the statistics for all the routes in which "push NH0" appears. This can be an expensive operation if "push NH0" appears in many routes.

Although many of the examples given above were in the context of MPLS, concepts described herein are not limited to MPLS. In general, any routing mechanism in which actions on the data units can be formulated as partial updates may be implemented using next hop chaining. For example, class-of-service (CoS) updates, statistics-gathering, policers, NAT updates, layer-2 rewrites, or other next hop actions may be implemented using next hop chaining.

Regarding CoS, CoS updates may relate to the marking of certain data units with class of service tags. For example, all data units in which a particular condition is satisfied (e.g., all data units having an even valued inner label) may be marked as belonging to a first class of service. In this case, next hop chaining could be used to link the action "mark as class 1" with any route that satisfies this condition.

Regarding policers, policing actions may generally take an action based on, for instance, a byte count associated with the policer. For example, assume that all data units having an inner label that satisfies a certain condition (e.g., the label is within a preset range) are be to limited to a certain aggregate bandwidth threshold. In this case, next hop chaining could be used to aggregate the number of bytes corresponding to the policer and perform a thresholding action, such as dropping data units when the threshold is exceeded.

An example of next hop chaining in which the next hop actions include policing and CoS related actions will now be discussed with respect to FIGS. 11A through 11D.

FIG. 11A is a diagram illustrating exemplary routes. In particular, assume there are 1000 possible routes, labeled as routes RT1 through RT1000. Each route includes an inner label (one of labels 1001 through 2000), an outer label (10, 000), and an egress rewrite (fe000).

In this example, assume that data units matching routes which correspond to the odd inner label values (1001, 1003, . . . 1999) are to be marked with a CoS label C1, and data unit matching routes which correspond to the even inner label values (1000, 1002, . . . 2000) are to be marked with the CoS label C2. Further, assume that that inner labels 1001 through 1500 are to a set of VPN sites that are to be policed to an aggregate of B1 Mbps bandwidth and the other inner labels (1501 through 2000) do not need to be policed. Further, assume that all the label switched paths going through label 10,000 should be policed at B2 Mbps bandwidth.

FIG. 11B is a diagram illustrating routes RT1 through RT1000, represented using a flat, non-chained representation for the next hops. As shown in FIG. 11B, the next hop actions for each route includes actions for policing and CoS. Route 1, for instance, includes a policing action that limits that bandwidth to the minimum of bandwidth B1 and B2 (shown in FIG. 11B as "police(min(B1, B2))"). The policing action in the flat representation of the next hops, because it is flattened to a single next hop action, may not be able to fully represent the desired hierarchical policing based on two different labels. Instead, the minimum bandwidth value is policed. Additionally, route 1 includes the CoS action "mark C1." With the non-chained representation shown in FIG. 11B, the CoS marking action is repeated in each flat rewrite, resulting in the activity for marking the data unit as "mark C1" appearing 500 times in the route rewrite table of FIG. 11B.

FIG. 11C is a diagram illustrating an exemplary next hop table, similar to next hop table 630 (FIG. 6), for the routes shown in FIG. 11A. Each next hop action is associated with a corresponding next hop index N1 through N1006. In the table in FIG. 11A, the next hop actions "egress through fe000," "push 10000," "mark C1," "mark C2," "police to B1 Mbps," and "police to B2 Mbps" each need to be only stored once.

FIG. 11D is a diagram illustrating an exemplary next hop logical chain table, similar to next hop logical chain table 640 (FIG. 6). As can be seen, each chain of next hop actions includes one of "mark C1" (index N3) or "mark C2" (index N4). Additionally, both policing actions (indexes N5 and N6) can potentially occur, in a chained manner, within a route.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention. While a series of blocks has been described in FIG. 7, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
    obtaining, by a device and from a first data structure of the device, a link to information identifying a plurality of next hops and an action to be performed on a data unit,
        the information identifying the plurality of next hops and the action being stored in a second data structure of the device,
        the link to the information identifying the plurality of next hops and the action being obtained based on a header of the data unit; and
    rewriting, by the device, a portion of the header of the data unit to include the link to the information identifying the plurality of next hops and the action,
        the data unit being forwarded, based on the link to the information identifying the plurality of next hops and the action, towards a destination associated with the data unit after the portion of the header of the data unit has been rewritten.

2. The method of claim 1, further comprising:
    obtaining, from the header of the data unit, information identifying a route associated with the data unit,
        where the link to the information identifying the plurality of next hops and the action is obtained, from the first data structure, based on the information identifying the route.

3. The method of claim 1, where, when rewriting the portion of the header of the data unit, the method includes:
    rewriting at least one of layer 2 information or layer 3 information included in the portion of the header of the data unit.

4. The method of claim 1, where the action includes:
    an action associated with a layer 2 portion of the data unit.

5. The method of claim 1, where the action includes:
    an action associated with a layer 3 portion of the data unit.

6. The method of claim 1, further comprising:
    forwarding the data unit towards one or more interfaces of the device.

7. The method of claim 1, where, when rewriting the portion of the header of the data unit, the method includes:
    rewriting the portion of the header of the data unit using a rewrite string associated with next hop information for the data unit.

8. A system comprising:
    a device to:
        obtain, from a first data structure of the device, a link to information identifying a plurality of next hops and an action to be performed on a data unit,
            the information identifying the plurality of next hops and the action being stored in a second data structure of the device,
            the link to the information identifying the plurality of next hops and the action being obtained based on a header of the data unit; and
        rewrite a portion of the header of the data unit to include the link to the information identifying the plurality of next hops and the action,
            the data unit being forwarded, based on the link to the information identifying the plurality of next hops and the action, towards a destination associated with the data unit after the portion of the header of the data unit has been rewritten.

9. The system of claim 8, where the device is further to:
    obtain, from the header of the data unit, information identifying a route associated with the data unit,
        where the link to the information identifying the plurality of next hops and the action is obtained, from the first data structure, based on the information identifying the route.

10. The system of claim 8, where the device, when rewriting the portion of the header of the data unit, is to:
    rewrite at least one of layer 2 information or layer 3 information included in the portion of the header of the data unit.

11. The system of claim 8, where the action includes:
    an action associated with a layer 2 portion of the data unit.

12. The system of claim 8, where the action includes:
    an action associated with a layer 3 portion of the data unit.

13. The system of claim 8, where the device is further to:
    forward the data unit towards one or more interfaces of the device.

14. The system of claim 8, where the device, when rewriting the portion of the header of the data unit, is to:
    rewrite the portion of the header of the data unit using a rewrite string associated with next hop information for the data unit.

15. A device comprising:
    a routing component, at least partially implemented in hardware, to:
        obtain, from a first data structure of the device, a link to information identifying a plurality of next hops and an action to be performed on a data unit,
            the information identifying the plurality of next hops and the action being stored in a second data structure of the device,
            the link to the information identifying the plurality of next hops and the action being obtained based on a header of the data unit; and
        rewrite a portion of the header of the data unit to include the link to the information identifying the plurality of next hops and the action,
            the data unit being forwarded, based on the link to the information identifying the plurality of next hops and the action, towards a destination associated with the data unit after the portion of the header of the data unit has been rewritten.

16. The device of claim 15, where the routing component is further to:
    obtain, from the header of the data unit, information identifying a route associated with the data unit, where the link to the information identifying the plurality of next hops and the action is obtained, from the first data structure, based on the information identifying the route.

17. The device of claim 15, where the routing component, when rewriting the portion of the header of the data unit, is to:
    rewrite at least one of layer 2 information or layer 3 information included in the portion of the header of the data unit.

18. The device of claim 15, where the action includes:
    an action associated with a layer 2 portion of the data unit, or
    an action associated with a layer 3 portion of the data unit.

19. The device of claim 15, where the routing component is further to:
    forward the data unit towards one or more interfaces of the device.

20. The device of claim 15, where the routing component, when rewriting the portion of the header of the data unit, is to:
    rewrite the portion of the header of the data unit using a rewrite string associated with next hop information for the data unit.

* * * * *